United States Patent [19]

Cramer et al.

[11] Patent Number: 5,288,767
[45] Date of Patent: Feb. 22, 1994

[54] TWO-COMPONENT ADHESIVE COMPOSITION FOR THE CHEMICAL FIXING TECHNIQUE

[75] Inventors: Edwin Cramer, Ludwigshafen; Dankmar Scholz, Frankenthal, both of Fed. Rep. of Germany

[73] Assignee: BASF Aktiengesellschaft, Ludwigshafen, Fed. Rep. of Germany

[21] Appl. No.: 947,572

[22] Filed: Sep. 21, 1992

[30] Foreign Application Priority Data

Sep. 21, 1991 [DE] Fed. Rep. of Germany ....... 4131458

[51] Int. Cl.⁵ .............................. C08F 4/34; B32B 5/20
[52] U.S. Cl. ................................... 521/147; 521/149; 521/150; 525/263; 525/328.9; 525/329.2; 525/329.5; 525/330.3; 525/330.5; 525/360; 525/370; 525/379; 525/387; 526/227; 526/313; 526/321
[58] Field of Search ................. 525/328.9, 263, 329.2; 526/313; 521/147, 149, 150

[56] References Cited

U.S. PATENT DOCUMENTS

| | | | |
|---|---|---|---|
| 4,174,311 | 11/1979 | Nakano | 525/263 |
| 4,259,462 | 3/1981 | Nakano et al. | 525/263 |
| 4,417,028 | 11/1983 | Azevedo | 525/285 |
| 4,944,819 | 7/1990 | Gebauer | 156/78 |

FOREIGN PATENT DOCUMENTS 0150555 9/1988 European Pat. Off. .

*Primary Examiner*—Bernard Lipman
*Assistant Examiner*—Fred Zitomer
*Attorney, Agent, or Firm*—Oblon, Spivak, McClelland, Maier & Neustadt

[57] ABSTRACT

A two-component adhesive composition for the chemical fixing technique comprises a radical-curable synthetic resin having a viscosity of from 100 to 10 000 mPa.s at 23° C. and spatially separated therefrom—a curing agent of the synthetic resin. The synthetic resin contains as binder a di(meth)acrylate of an alkoxylated bisphenol. The adhesive composition is for use in fixing anchor bolts, screws and plugs in drilled holes.

8 Claims, No Drawings

TWO-COMPONENT ADHESIVE COMPOSITION FOR THE CHEMICAL FIXING TECHNIQUE

The use of reactive resin compositions based on unsaturated polyester resins, vinyl ester resins or epoxy resins as adhesives and coupling agents for the chemical fixing technique is well known. The reactive resin systems in question are two-component systems, of which one component contains the reactive resin and the other the curing agent. Either component or both of the components may contain other, customary constituents such as fillers, accelerants, stabilizers and solvents, including reactive solvents or diluents. Mixing the two components then initiates the reaction which leads to the formation of a cured product.

To fix anchor bolts in holes drilled in concrete or solid rock it is generally customary to use capsules comprising two chambers to keep the components apart. The capsule is inserted into the hole. Then the fixing element is inserted into the hole by rotary percussion, destroying the capsule and the chambers. The two components become mixed, initiating the reaction. The cured resin composition is capable of inducting force into the substrate without spreading pressure. Such anchorages have proved suitable in the past in particular for heavy-load attachments.

In the case of anchorages in a porous substrate, for example in foamed concrete block or in mud brick or else in cavity brick, it is possible to use two-chamber cartridges. The two components of the adhesive composition are simultaneously squeezed out of the cartridge, mixed by suitable means, for example static mixers or screws, and forced into the drilled hole. The hole can then be entered directly with an anchorable fixing element of any desired cross-section, which becomes fixed in the hole when the resin has cured, or first a plug or an internal thread sleeve is inserted into the hole and fixed in place by the curing of the resin, and screws or bolts can then be screwed or bolted in. In the case of cavity brick, the drilled hole is first lined with a mesh-type, cylindrical sleeve made of plastic or metal. Then resin is forced in from the two-chamber cartridge. Insertion of a plug or of an internal thread sleeve then forces excess adhesive through the openings in the perforated sleeve, so that a firm anchorage develops on curing of the adhesive composition.

In the case of anchorages behind ®Rigips board in cavity brick the cartridges employed contain foamable adhesive compositions as described for example in EP-A-338 983. One component of the adhesive composition contains an inorganic carbonate, for example chalk, while the other component contains an acid, for example polyacrylic acid or phosphoric acid. The drilled hole is lined with an internal thread sleeve or a perforated sleeve, and the foamable adhesive composition is forced in. As the components become mixed, $CO_2$ is released and causes the adhesive composition to foam up and fill out the hollow spaces or form behind the board a mushroom-shaped anchorage within which, as the adhesive composition cures, the sleeves become fixed.

EP-B-150 555 and EP-A-199 671 describe capsules for use in fixing an anchor bolt, which contain two mutually separate chambers. One of the chambers contains an epoxy acrylate (vinyl ester resin) together with styrene as comonomer, the other a curing agent therefor. Preferred epoxy acrylates are those of the formula

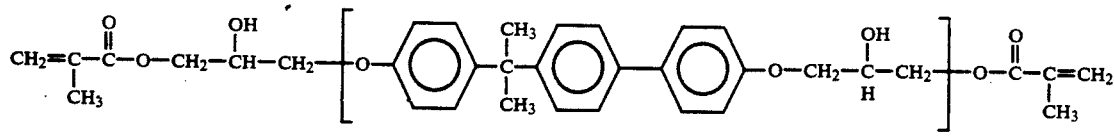

They are in general diluted with the reactive comonomer styrene in order to bring them to the most suitable processing viscosity.

These resins have a high rate of curing, the cured products are highly chemical- and water-resistant, and the pullout resistance is high. However, the volatile comonomer styrene constitutes an odor nuisance; furthermore, by law certain precautions must be observed in the preparation and handling of styrene-containing adhesive compositions.

It is admittedly possible in principle, to replace the styrene with other comonomers, for example acrylates; however, they need to be used in such large amounts as to impair the mechanical properties of the anchorage.

It is an object of the present invention to make available a synthetic resin for the chemical fixing technique that in the cured state has a balanced range of good mechanical properties, in particular good adhesion to silicatic materials, and that is virtually free of styrene as comonomer.

We have found that this object is achieved by using as curable synthetic resin a di(meth)acrylate of an alkoxylated bisphenol. The present invention accordingly provides a two-component adhesive composition for the chemical fixing technique, comprising I. a synthetic resin having a viscosity within the range from 100 to 10 000 [mPa.s] at 23° C. and comprising a di(meth)acrylate of an alkoxylated bisphenol, and II. a curing agent for the synthetic resin.

In general, the adhesive material will be packaged in the form of a 2-chamber capsule. A proven form of capsule is a glass capsule, since the "packaging material" glass is finely ground in the course of the mixing process and then becomes integrated in the binder matrix as a reinforcing filler. It is also possible to use multichamber capsules made of a ceramic material, as described for example in DE-A-39 29 603.2. It is further possible to use large-capacity capsules made of various plastics sheet systems, known as tube capsules. It is also possible, in principle, to separate the components from one another by macroencapsulating one of them, preferably the curing agent.

The cartridges used are preferably two-chamber cartridges in which the larger chamber contains the resin and the smaller chamber contains the curing agent. The larger chamber is about 5-10 times larger in capacity than the smaller chamber.

One of the components of the adhesive composition according to the present invention is a synthetic resin having a viscosity (at 23° C.) within the range from 100 to 10 000, preferably from 200 to 2 000, in particular from 500 to 1 500, mPa.s, measured in the absence of fillers. It comprises a di(meth)acrylate of an alkoxylated bisphenol. Substances of this type are customarily prepared by reaction of bisphenol, for example bisphenol A, bisphenol F or bisphenol S, with an alkylene oxide, for example ethylene oxide, or propylene oxide, and subsequent esterification with methacrylic or acrylic acid or transesterification with a (meth)acrylic ester. The viscosity of the synthetic resin can inter alia be controlled via the chain length of the alkylene oxide groups. An alkylene oxide:bisphenol ratio of 2:1 precisely will give waxy or crystalline compounds which of themselves are not suitable for use as synthetic resin for the purposes of the present invention. A slight increase in the ratio gives a low-viscosity, liquid mixture of alkylene oxide compounds of different chain lengths; however, very long alkylene oxide chains in the molecule will again raise the viscosity unduly. The optimum chain length lies probably within the range from $n=1.05$ to $n=1.5$. The preferred bisphenol is bisphenol A, the preferred alkylene oxide is ethylene oxide, and methacrylic acid is preferred to acrylic acid. This results in a compound of the formula

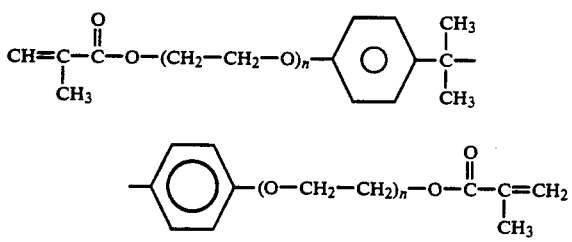

where n is from 1.0 to 5.0, preferably from 1.05 to 1.5.

If the viscosity of the di(meth)acrylate is too high (for example in the case of $n=1.0$), it can be reduced by adding high-boiling comonomers. Suitable for this purpose are acrylates, such as trimethylolpropane triacrylate and methacrylate, butanediol dimethacrylate, ethylene glycol dimethacrylate, polyethylene glycol dimethacrylate, neopentylglycol dimethacrylate, pentaerythritol dimethacrylate and acetoacetoxyethyl methacrylate, allyl compounds such as diallyl phthalate, allylphenols and allylphenol ethers, and also maleimides, such as N-phenylmaleimide.

The amount of comonomer in the synthetic resin should not exceed 40% by weight, since otherwise the mechanical properties of the anchorage are too adversely affected. Preference is given to comonomer contents within the range from 5 to 25% by weight. The synthetic resin should be virtually styrene-free; that is, the styrene content is less than 1% by weight, in particular less than 0.1% by weight.

The synthetic resin may contain from 2 to 20% by weight of other curable resins, such as polyester, vinyl ester, bismaleimide or epoxy resins, and also, for the purpose of impact modification, from 2 to 20% by weight of a thermoplastic, such as polyamide or polyester, or of a rubber.

If accelerants are necessary for peroxide curing, they are advantageously arranged in spatial terms together with the resin, ie. separated from the curing agent. Suitable accelerants are aromatic amines such as N,N-dimethylaniline, N,N-diethylaniline, toluidines and xylidines such as N,N-diisopropylidene-para-toluidine, N,N-dimethyl-p-toluidine, N,N-bis(2-hydroxyethyl)xylidine and also cobalt, magnesium, tin or cerium salts, such as cobalt naphthenate, and also mixtures of amine and cobalt accelerants.

Accelerants are preferably present in the synthetic resin in amounts of from 0.5 to 5% by weight.

The chamber which contains the synthetic resin component may in addition also contain fillers. Suitable reinforcing fillers for the adhesive composition are for example quartz, glass, corundum, porcelain, stoneware, barite, lightspar, talc and chalk. The fillers are mixed either into the resin solution and/or curing agent or initiator in the form of sands, powders or specific shapes (cylinders, spheres, etc.). The fillers can be used as fibers (fibrillar fillers). Preferable and distinctly more reinforcing are globular inert materials (ball shape).

The curing agent for the resin is present spatially separated therefrom. Preferred curing agents are organic peroxides which decompose at low temperatures. Of particular suitability are benzoyl peroxide and methyl ethyl ketone peroxide, also tert.-butyl perbenzoate, cyclohexanone peroxide, lauroyl peroxide and cumene hydroperoxide, and also mixtures of different peroxides. The peroxides are preferably used in amounts of from 0.5 to 10% by weight, preferably from 1 to 5% by weight. The curing agents are advantageously applied to inert fillers, preference being given to quartz sands of particle size 0.5...3 mm for capsule dimensions $<M16$ and 3...6 mm in the case of dimensions $>M20$.

In the case of foamable adhesive compositions it is advantageous to add the carbonate to the resin while the acid component may be housed together with the curing agent in one chamber or else may be introduced into a separate, third chamber.

The adhesive composition according to the present invention can be used for the chemical fixing technique without odor nuisance and without special precautions. Anchorages of this type are characterized by advantageous crack propagation characteristics, low shrinkage tension and excellent adhesion to mineral receiving materials, such as concrete and natural stone, and to foamed and cavity blocks.

In the Examples, the parts and percentages are by weight.

EXAMPLES

A. Preparation of Dimethylacryloyl Compound

710 Parts of 2,2-bis(4-(2-hydroxyethoxy)phenyl) propane, 390 parts of methacrylic acid, 3 parts of hydroquinone monomethyl ether, 0.3 part of bis-tert.-butyl-paracresol and also 10 parts of sulfuric acid are dissolved in 340 parts of toluene. 80 Parts of water are distilled off azeotropically under solvent reflux. Then the solvent and the remaining methacrylic acid are removed under reduced pressure. One part of N,N-diisopropylidene-para-toluidine and 2 parts of cobalt octoate solution (containing 10% of Co++) are added to the resin as accelerant.

Degree of condensation (determined by $^1$H-NMR spectroscopy): $n=1.1$ Viscosity of resin at 25° C.: 1 500 mPa.s.

B. Preparation of a Cartridge

| Chamber I: | |
|---|---|
| Diameter: | 5 cm |
| Length: | 15 cm |
| Contents: | 40% of resin A |

| | |
|---|---|
| | 60% of quartz 1.5 ... 2.0 mm |
| Chamber II: | |
| Diameter: | 2 cm |
| Length: | 15 cm |
| Contents: | 1:1 Cumene hydroperoxide/benzoyl peroxide, 20% in gypsum, incipiently pasted in a plasticizer. |

The shared opening to the two side-by-side chambers is fitted with a 15 cm long, conical tip housing a mixing screw.

A hollow block (wall thickness 3 cm) was drilled to form a hole 1 cm in diameter, and a 5 cm long perforated sleeve was inserted into the hole. Resin and curing agent were expressed from the cartridge, mixed and forced into the perforated sleeve. Then a threaded sleeve was inserted into the perforated sleeve. After 1 h at 20° C. the resin had cured to fix the threaded sleeve in the hollow block. Then an anchor bolt was bolted into the threaded sleeve.

We claim:

1. A capsule or cartridge containing a two-component adhesive composition substantially styrene-free, comprising:

I. a curable resin of the formula $$CH_2=C-C-O-(CH_2-CH_2-O)_n-\phi-C(CH_3)_2-\phi-(O-CH_2-CH_2)_n-O-C-C=CH_2$$
   (with CH$_3$ substituents)

wherein the average degree of condensation n is from 1.05 to 1.5 and having a viscosity of from 100 to 10,000 mPa.s at 23° C., and II. a curing agent for the curable resin I, wherein the curable resin I and curing resin II are present in said capsule or cartridge separated from each other.

2. The capsule or cartridge of claim 1, wherein the curable resin contains from 0 to 40% by weight of a comonomer selected from the group consisting of acrylates, 3. The capsule or cartridge of claim 2, wherein the comonomer is selected from the group consisting of trimethylolpropane triacrylate, butanediol dimethacrylate, ethylene glycol dimethacrylate, polyethylene gylcol dimethacrylate, acetoacetoxyethyl methacrylate, diallyl phtalate, allylphenols, allyphenol ethers and N-phenylmaleimide.

4. The capsule or cartridge of claim 3, wherein the comonomer is present in the curable resin in an amount of 2 to 25% by weight.

5. The capsule or cartridge of claim 1, wherein the curable resin contains an accelerant for the curing agent.

6. The capsule or cartridge of claim 5, wherein the accelerant is cobalt naphthenate or an organic amine.

7. The capsule or cartridge of claim 1, wherein the curing agent is an organic peroxide and is present in an amount of 0.5 to 10% by weight, based on the curable resin.

8. The capsule or cartridge of claim 1, wherein the adhesive composition is foamable by additionally containing, separated from each other, a carbonate and an acid.

* * * * *